United States Patent Office 3,367,889
Patented Feb. 6, 1968

3,367,889
PROCESS FOR THE PREPARATION OF MACRO-RETICULAR-STRUCTURED COPOLYMERS
James A. Oline, Wyncote, Pa., assignor to Rohm & Haas Company, Philadelphia, Pa., a corporation of Delaware
No Drawing. Filed Oct. 28, 1963, Ser. No. 319,578
4 Claims. (Cl. 260—2.1)

This invention concerns a process for the preparation of copolymers which possess a macroreticular structure. It also concerns the preparation of cross-linked copolymers which are of value for the preparation of ion exchange resins. This, however, is but one of the uses of the copolymers of the present invention since they can be prepared as masses having variable density and having variable specific surface and porosity. Thus, the copolymers per se, without chemical modification, can be used as carriers for catalysts, and, particularly if cast in sheet form, can be used as decorative or structural elements in a variety of constructions. They can also be used in the separation of polymers of different molecular weights by the well-known gel permeation methods.

In order to prepare ion exchange resins from the copolymers, they must be chemically modified by methods well-known in the art. Thus, if they contain aryl nuclei, they can be sulfonated to produce strongly acidic cation exchangers, or they can be chloromethylated and aminated to produce anion exchangers either of the weak base or strongly basic types.

Carboxylic acid type cation exchangers can be prepared if some or all of the monoethylenically unsaturated monomers have ester or carboxyl groups. If the ester group is present in the monoethylenically unsaturated monomer, it can be hydrolyzed to produce a carboxylic type cation exchanger or it can be aminolyzed to produce an anion exchanger. Thus, a crosslinked alkyl acrylate or methacrylate copolymer can be employed to produce carboxylic exchangers or anion exchangers by the methods noted hereinbefore. If a mixture of monoethylenically unsaturated monomers, for instance, styrene and an alkyl acrylate or methacrylate, is used, then a sulfocarboxylic type exchanger can be prepared by sulfonation of the aryl nuclei and hydrolysis of the ester group. By using a similar mixture of monoethylenically unsaturated monomers and aminolyzing and sulfonating, an "amphoteric" ion exchange resin can be prepared containing both sulfonic acid groups and anion exchange groups.

It has been proposed to produce macroreticular (as hereinafter described) copolymers by copolymerizing a monoethylenically unsaturated monomer and a polyethylenically unsaturated monomer in the presence of a non-aqueous compound, which is a solvent for the monomer mixture but which does not swell or which will not be imbibed by the copolymer so formed. Depending on the particular monomer systems employed, such compounds, referred to in the prior art as "precipitants" are higher aliphatic hydrocarbons, higher alkanols, nitrohydrocarbons or higher alkyl esters of organic acids. They are characterized by the fact that they are substantially insoluble in water, and are higher molecular weight organic compounds, typical of which would be alkanes from heptane to dodecane, alkanols such as sec-butanol, methyl isobutyl carbinol, t-amyl alcohol, and, depending on the monomer systems, may be an ester, such as di-octyl sebacate. As set forth hereinbefore, these precipitants must be solvents for, or soluble in, the monomers employed. The details of the preparation of typical prior art macroreticular-structured resins appear in U.S. Patent 3,037,052, and a definition of the term "macroreticular structure" is given in very considerable detail.

It has now been found that macroreticular-structured copolymers can be prepared by copolymerizing a monoethylenically unsaturated monomer and a polyethylenically unsaturated monomer in the presence of water, said water being distributed throughout the monomer mixture. This is completely unanticipated by any of the previously proposed methods of preparation, since they all indicate that the substance to be added as a "precipitant" must be soluble in the monomer mixture, and water is insoluble in most of the monomers, either monoethylenically unsaturated or polyethylenically unsaturated, which are used in the process of the present invention. Further, the use of water extender makes it unnecessary to incorporate a cross-linker to get the desired porosity deriving from the macroreticular structure if a porous polymer is desired for structural or decorative purposes. It is, of course, necessary to incorporate a cross-linker into the polymer structure to render it insoluble if the polymer is to be used directly as or processed further to an ion exchange resin.

Suitable monoethylenically unsaturated monomers include the following: acrylic acid, methacrylic acid, methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, styrene, vinyltoluene, vinylnaphthalene, and similar unsaturated monomers.

Another class of suitable monoethylenically unsaturated monomers include the ring-containing nitrogen heterocyclic compounds such as vinylpyridine, 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, 2-methyl-5-vinylquinoline, 4-methyl-4-vinylquinoline, 1-methyl- or 3-methyl-5-vinylisoquinoline, N-vinylcaprolactam and N-vinylbutyrolactam.

Copolymers of the above monomers with monoethylenically unsaturated compounds, such as dialkyl maleates, dialkyl fumarates, dialkyl crotonates, dialkyl itaconates, and dialkyl glutaconates are also possible. Vinyl esters of carboxylic acids can also be used.

Suitable polyethylenically unsaturated compounds include the following: divinylbenzene, divinylpyridine, divinyltoluenes, divinylnaphthalenes, diallyl phthalate, ethylene glycol diacrylate, ethylene glycol dimethacrylate, 1,3-butanediol dimethacrylate, divinylxylene, divinylethylbenzene, divinylsulfone, polyvinyl or polyallyl ethers of glycol, of glycerol, of pentaerythritol, of mono- or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di(α-methylmethylene sulfonamido)ethylene, trivinylbenzene, trivinylnaphthalene, and polyvinylanthracenes.

Particularly preferred polyethylenically unsaturated monomers, commonly known as "cross-linkers," include the following: polyvinylaromatic hydrocarbons such as divinylbenzene and trivinylbenzene, glycol dimethacrylates, such as ethylene glycol dimethacrylate, and polyvinyl ethers of polyhydric alcohols, such as divinoxyethane and trinoxypropane. These are used if "normal" copolymerization is desired.

If post-curable compositions are desired, cross-linkers such as conjugated dienes are employed. Typical of these are butadiene, isoprene and chloroprene.

The ratio of the monoethylenically unsaturated monomers to the polyethylenically unsaturated monomers may be varied widely within the scope of the present invention, depending on the use for which the copolymer is intended. As is well-known in the art, the polyethylenically unsaturated monomers function as cross-linking agents by bridging linear polymer chains. The ratio of the polyethylenically unsaturated to monoethylenically unsaturated monomers is an indication of the amount of cross-linking present in the copolymer. It is important to control accurately the ratio of polyethylenically unsaturated monomers to monoethylenically unsaturated monomers, since the degree of cross-linking has a profound effect on the physical properties of the product.

The mixture of monomers containing water dispersed throughout the mixture is copolymerized in a confined reaction zone to produce a copolymer mass. If it is desired to have the copolymer in sheet form, it is cast between plates of glass suitably spaced. Reaction kettles of various types may be employed but are not preferred because of the difficulty involved in removing the finished copolymer therefrom.

Molds of a variety of shapes and sizes can also be employed and, when employing the compositions of the present invention as potting compounds, the outer container of the article being potted may function as the mold.

The copolymerization is carried out at elevated temperatures in preferred embodiments of this invention in which the copolymer masses may be used in the form in which they are produced or they may be comminuted to produce particles of any desired size.

It is well-known that oxygen acts as an inhibitor of free radical polymerizations and should, therefore, be excluded. The preferred embodiments of this invention effect polymerization under substantially anaerobic conditions.

Suitable catalysts which provide free radicals which function as reaction initiators include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc.

The amount of peroxidic catalyst rquired is roughly proportional to the concentration of the mixture of monomers. The usual range is 0.01% to 3% of catalyst with reference to the weight of the monomer mixture. The preferred range is from 0.2% to 1.5%. The optimum amount of catalyst is determined in large part by the nature of the particular monomers selected, including the nature of the impurities which may accompany said monomers.

Another suitable class of free radical generating compounds are the azo catalysts. There may be used, for example, azodiisobutyronitrile, azodiisobutyramide, azobis(α,α-dimethylvaleronitrile) azobis(α-methylbutyronitrile), dimethyl, diethyl, or dibutyl azobis(methylvalerate). These and other similar azo compounds serve as free radical initiators. They contain an —N=N— group attached to aliphatic carbon atoms, at least one of which is tertiary. An amount of 0.01% to 2% of the weight of monomer or monomers is usually sufficient.

Another method of effecting polymerization of the compositions of the present invention is by subjecting the reaction mixture to ultraviolet light in the presence of suitable catalysts at ambient or slightly elevated temperatures. Such catalysts include benzoin, azoisobutyronitrile, etc.

Another method of effecting polymerization is the use of water-soluble free radical initiators. Typical of these are the alkali metal and ammonium persulfates and azobisisobutyric acids.

Helping to keep the water dispersed throughout the polymer mixture, and otherwise aiding in the polymerization, are one or more surface active agents. The preferred types of surfactants which can be employed in the processes of the present invention are the non-ionics and the anionics. Examples of the non-ionics are well-known to those skilled in the art, but particularly preferred are polyoxyethylated alkylphenols and alkylaryl ethers. These, as is well-known, are non-ionic in nature. Typical of the anionic type surfactants are the higher alkyl sulfate salts and alkylaryl sulfonates. More particularly preferred are octyl- or nonyl-phenoxy(polyethoxyethanols) in which the ethoxy groups range from 0 to 69. Of the anionic types, sodium lauryl sulfate and dodecylbenzene sodium sulfonate are particularly preferred. Certain alkyl sodium sulfates such as sodium lauryl sulfate have been proven to be very effective at concentrations as low as 0.05%, while up to 20% on the weight of the mixture may be required when using other types. Depending on the particular monomer systems being employed, and the amount of water being used, mixtures of both the non-ionic and the anionic types may be preferred.

In some cases, particularly if it be desired to store the uncured composition for any appreciable period of time, it may be advisable to add colloids which are water-soluble. Typical of such water-soluble polymers are sodium polyacrylate, carboxymethyl cellulose and hydroxethyl cellulose.

The amount of water used will vary depending on the monomer system being employed and the degree of porosity and/or toughness of the product desired. It ranges from as little as 5% of the total mixture up to as much as 70% of the total mixture. Typical variations on the amount of water used are shown in the examples hereinafter.

The order of addition on mixing the components of these water-extended systems can be varied, but it is preferred particularly if water-soluble initiators are being used, that the monomer plus the monomer soluble adducts (surfactants, initiators, etc.) be thoroughly mixed and that the aqueous mixture which may contain water-soluble surfactants and optionally water-soluble initiators can be added during or before agitation. The agitation should be continued until a uniform cream or paste is produced.

The polymerization temperature also depends on a variety of conditions, such as the size of the charge being polymerized, the amount of initiator and the specific monomers employed. In many cases, long periods at temperatures as low as 20° C. will effect polymerization and such conditions are particularly applicable to large charges and/or particularly reactive monomers. Such low temperature polymerization conditions are effective in dissipating any exotherm and also cure at elevated temperatures may frequently then be employed. A range of from 25° to 150° C. may be employed, with a particularly preferred range being from 70° to 110° C. As set forth hereinbefore, the products of the present invention may be employed as intermediates in the production of ion exchange resins and such intermediates are preferably cross-linked by reaction of the monoethylenically unsaturated monomer with a polyethylenically unsaturated monomer. For these uses, the amount of polyethylenically unsaturated monomer may vary from about 1% to 50%. However, the products of the present invention are not limited for use as intermediates in ion exchange resins, and there are uses, for instance, such as structural or decorative uses or use as flotation devices in which it is not necessary that the product be cross-linked.

EXAMPLE I

*Preparation of macroreticular-structured styrene-divinylbenzene copolymer*

A macroreticular-structured styrene-5% divinylbenzene copolymer was prepared with a monomer/water-surfactant ratio of 84.5/15.5, and a catalyst content based on monomer is 1% $Bz_2O_2$ as follows: 5 grams of commercial grade divinylbenzene (60% DVB), 55 grams of styrene, 0.6 gram of benzoyl peroxide and 1 gram of a surfactant which was octylphenoxypolyethoxyethanol containing 2 ethoxy groups were weighed into a 4 oz. jar, dissolving each ingredient as charged. To the monomer solution was added 10 grams of an aqueous solution of surfactants consisting of 6.3% of an octylphenoxypolyethoxyethanol containing 39 ethoxy groups and 0.3% sodium lauryl sulfate. The jar was capped and shaken intermittently to homogenize. The dispersed monomers were polymerized in the form of small plugs. This was done by pouring the dispersion into 1″ x 3″ vials, the dispersion volume being one-half to two-thirds of the volume of the vial. The vial was tightly sealed with a cap lined with aluminum foil. The following heating schedule was used to polymerize the dispersion:

16 hours at 65° C. to effect polymerization, then
64 hours at 75° C. to cure and dry the polymer.

The resulting polymer was opaque white in appearance and had a porosity of 10.3 volume percent.

The polymer plug was broken into small pieces and these were screened. The cut passing through U.S. Sieve No. 16 but retained on U.S. Sieve No. 50 was selected for conversion to an ion exchange resin.

EXAMPLE II

*Sulfonation of macroreticular-structured styrene-divinylbenzene copolymers*

Five grams of the screened copolymer were charged to 25 grams of ethylene dichloride in a 125 ml. Erlenmeyer flask and allowed to swell for ¾ hour at 25° to 30° C. While maintaining a temperature in the range of 25° C. to 70° C., 40 grams of a 50/50 mixture of EDC/chlorosulfonic acid were added to the copolymer/EDC mixture over a period of ½ hour. The contents of the Erlenmeyer flask were protected from the atmosphere by means of a rubber stoppered drying tube filled with Drierite. The sulfonation mixture was shaken occasionally and then allowed to stand overnight at room temperature (25° to 30° C.). The sulfonated resin product was recovered from the sulfonation mixture as follows: the Erlenmeyer flask was cooled in an ice bath and then cautiously hydrated with ice, washed with water, steam distilled to remove traces of EDC, then finally washed with deionized water. Evaluation of the product gave the following results:

Solids=36.8%
Cation exchange capacity ($H^+$)=5.92 meq./gm. dry

EXAMPLE III

*Preparation of sulfonic acid resins from a macroreticular-structured copolymer*

Sulfonic resins have been prepared, as described in Example I, from styrene-divinylbenzene copolymers formulated at several DVB concentrations and at different monomer/water+surfactant ratios. Sulfonic resins were also prepared from copolymers of styrene cross-linked with trivinylbenzene (TVB) or 1,3-butanediol dimethacrylate (BGDM). Formulations and data on the sulfonic resins are presented in Table I:

TABLE I

| Run No. | Monomer Formulation Cross-Linking Agent | | Emulsion Monomer, Water+Surf. | Copol. Porosity Vol. (percent) | Sulfonic Resins | |
|---|---|---|---|---|---|---|
| | Kind | Amount, percent | | | Solids Content, percent | Capacity (CEC meq./gm. dry) |
| 1 | DVB | 10.0 | 74.1/25.9 | 19.2 | 43.7 | 5.25 |
| 2 | DVB | 20.0 | 74.1/25.9 | 25.9 | 54.9 | 4.99 |
| 3 | DVB | 20.0 | 50/50 | 34.4 | | |
| 4 | DVB | 30.0 | 79/21 | | 61.9 | 4.66 |
| 5 | DVB | 60.0 | 84.5/15.5 | | 65.4 | 4.15 |
| 6 | TVB | 2.1 | 74.5/25.5 | | 33.1 | 5.63 |
| 7 | BGDM | 5.0 | 70/30 | | | 1.6 |

EXAMPLE IV

*Preparation of anion exchange resins from macroreticular-structured copolymer*

Anion exchange resins of the strong and weak base types have been prepared from copolymers similar to those described in Examples 1 and 3. For example, 10 grams of a styrene-5% DVB copolymer formulated with a monomer/water-surfactant ratio of 74/26 and 65 grams of a mixture of chloromethyl ether (CME) and ethylene dichloride (EDC) containing 40% CME were charged to a 125 ml. Erlenmeyer flask and allowed to stand for ¾ of an hour. A rubber stoppered drying tube filled with Drierite was used to protect the chloromethylation mixture from the atmosphere. While maintaining a reaction temperature of 35° to 45° C., 8 grams of aluminum chloride (granular) were added over a 1¼ hour period; the reaction was allowed to proceed for 4 hours longer in the temperature range of 25° to 45° C.

The chloromethylated product was recovered from the reaction mixture by first cooling the mixture in an ice bath to 5° to 10° C., hydrolyzing it by the cautious addition of ice-water, filtering, washing with water several times and then filtering.

One-half the filtered chloromethylated product was charged to a 125 ml. Erlenmeyer along with 10 ml. of water and 6 grams of 50% NaOH. The mixture was cooled to 10° to 15° C., then twenty grams of a 40% aqueous solution of dimethylamine (DMA) was added over a 20-minute period. During the addition of DMA and for 4 hours longer, the temperature was maintained at 20° C. to 25° C. The aminated product was recovered by first washing the mixture with water, extracting 5 times with methanol, several times with water and finally filtering. Solids content and capacity data for this resin are presented in Table II. Table II also contains data for anion exchange resins prepared from copolymer formulated at different DVB levels, with different cross-linking agents and with different amines.

TABLE II

| | Monomer Formulation Cross-Linking Agent | | Emulsion, Ratio Monomer/Water-Surfactant | Copolymer Porosity (percent) | Chloromethylation Charge (gms.) | | |
|---|---|---|---|---|---|---|---|
| | Kind | Amount (percent) | | | Copolymer | CME/EDC | AlCl₃ |
| 1A | DVB | 5 | 74/16 | 21.1 | 10 | 65 | 8 |
| B | DVB | 5 | 74/16 | 21.1 | | | |
| 2A | DVB | 2.5 | 84.5/15.5 | 8.5 | 12 | 91 | 10 |
| B | DVB | 2.5 | 84.5/15.5 | 8.5 | | | |
| 3 | TVB | 2.1 | 74.5/25.5 | | 5 | 40 | 4 |
| 4 | EGDM | 5 | 70/30 | | 5 | 60 | 4 |

| | Amination | | | | | Product, Capacity (meq./gm. dry) | | | |
|---|---|---|---|---|---|---|---|---|---|
| | Charge (gms.) | | | Amine | | | | | |
| | Chloromethylated Product | Water | 50% NaOH | Kind | Amount | Solids (percent) | NH₃ | SO₄ | Total |
| 1A | A/2 [1] | 12 | 6 | 40% DMA | 20 | 53.4 | 3.59 | 0.83 | 4.42 |
| B | A/2 | 12 | 6 | 70% DMAE | 15 | 53.5 | 1.14 | 1.92 | 3.06 |
| 2A | B/2 | 12 | 6 | 40% DMA | 20 | 57.0 | 3.44 | 0.83 | 4.27 |
| B | B/2 | 12 | | 25% TMA | 30 | 44.7 | 0.74 | 3.67 | 4.41 |
| 3 | All Chloro. Prod. | 8 | | 25% TMA | 25 | 50.0 | 0.46 | 2.58 | 3.04 |
| 4 | All | 15 | 6 | 40% DMA | 50 | 44.3 | 3.57 | 0.95 | 4.52 |

[1] One-half of the total chloromethylated product prepared.
NOTE.—DMA—dimethylamine, TMA—trimethylamine, DMAE—dimethylaminoethanol.

EXAMPLE V

*Ion exchange resins from macroreticular-structured copolymers of methyl acrylate*

Copolymers of methyl acrylate and divinylbenzene were prepared by methods similar to those described in Example II. The final dried products were firm and opaque white in appearance. Screened cuts of these polymers were aminolyzed with dimethylaminopropylamine to give weak base anion exchange resins. Details on the copolymers and the aminated products are listed below in Table III:

TABLE III

| No. | Copolymer | | Aminolyzation | | Conditions | Product | |
|---|---|---|---|---|---|---|---|
| | DVB, percent | Emulsion Ratio, Monomer/Water-Surfactant | Charge (gms.) | | | Solids, percent | AEC, meq./gm. dry |
| | | | Copolymer | DMAPA | | | |
| 1 | 5 | 73.8 | 3.5 | 21 | (1) | 35.5 | 4.82 |
| 2 | 10 | 73.8 | 4.0 | 20 | (1) | 43.2 | 4.34 |
| 3 | 10 | 65.7 | 4.0 | 28 | (1) | 39.9 | 4.37 |

1 15 hrs. at 155° C. followed by methanol and water.

EXAMPLE VI

*Ion exchange resin from a copolymer of methacrylic acid*

A carboxylic cation exchange resin was prepared from a copolymer of methacrylic acid (MAA) and divinylbenzene in a manner similar to those described in Examples I and II. However, the high solubility of MAA in water necessitated a modification of the aqueous phase of the emulsion as follows:

(1) The use of NaCl or Na₂SO₄ to salt out the MAA;
(2) A more complex system of surfactants.

The monomer phase of the system was prepared by successively weighing into a 4 oz. jar 35 grams of MAA (glacial), 5 grams of commercial grade divinylbenzene (60%), 0.3 gram Bz₂O₂, and 1 gram octylphenoxyethanol containing 2 ethoxy groups, dissolving each ingredient as charged. To the monomer was added an aqueous solution consisting of the following ingredients: 28 grams water, 4 grams NaCl, 1.2 grams of octylphenoxy(polyethoxy)ethanol, 0.15 gram sodium lauryl sulfate, 1 gram of a poly(β-hydroxyethyldimethylamino methacrylate)phosphate, 1 gram of sodium-2-hydroxyoctadecyl sulfate, 1 gram Methocel (Dow), 0.4 gram sodium isopropylnaphthalene sulfonate, and diamyl ester of sodium sulfosuccinic acid. A homogeneous mixture was obtained after 30 to 40 minutes of intermittent shaking. The homogeneous mixture was then poured into vials and polymerized as described in Example I.

The final polymer was a hard and opaque white; its properties were:

Solids=32.3%
CEC (H⁺)=10.7 meq./gm. (dry)

EXAMPLE VII

A styrene-divinylbenzene mixture was made up from commercial divinylbenzene concentrate (55% divinylbenzene) and styrene to give a mixture containing 10% by weight divinylbenzene (100% basis). Benzoyl peroxide, 0.6 part, was dissolved in 60 parts of this monomer mixture. Seven parts of an aqueous solution containing 0.99% of a commercial grade of sodium lauryl sulfate was added to the organic solution and the two originally immiscible liquids were agitated for five minutes to produce a homogeneous, white, viscous paste. The paste was forced into a mold and heated for 16 hours at 65° to effect polymerization. The white polymer was removed from the mold and dried at 75° C. for 7 hours. It had a porosity of 0.09 ml./ml.

EXAMPLE VIII

Into 30 parts of methyl methacrylate, which had been stripped of inhibitor, was dissolved 0.2 part of benzoyl peroxide and 0.8 part of an octylphenoxypolyethoxyethanol containing 2 ethoxy groups. To the monomer solution was then added an aqueous solution of 0.3% sodium lauryl sulfate and 6.4% of an octylphenoxyethoxyethanol containing 40 ethoxy groups. The mixture was agitated vigorously for about five minutes to produce a homogeneous white, viscous cream. The fluid was poured into a cylindrical mold which had been previously flushed with nitrogen, and the mold was capped. The mold was heated at 70° C. for five hours after which time polymerization appeared to be complete. The mold was then uncapped and heated at 65° C. for 16 hours to remove most of the water in the polymer. The polymer was removed from the mold and dried for 6 hours more at 70° C. to drive off residual moisture. The polymer rod so obtained was white, opaque and tough, and had a density of 0.98 gm./ml.

EXAMPLE IX

Into 30.0 parts of styrene were dissolved 0.4 part of benzoyl peroxide and 1 part of an octylphenoxypolyethoxyethanol containing two ethoxy groups. To this organic solution was added 10 parts of an aqueous solution containing 6.35% of an octylphenoxypolyethoxyethanol containing 40 ethoxy groups and 0.3% of a commercial grade of sodium lauryl sulfate. The mixture was agitated intermittently for 10 minutes to form a homogeneous, white, slightly viscous paste. The paste was forced into an annular mold and the mold was capped. The assembly was heated for 72 hours at 65°±5° C. The cap was removed from the mold and the heating was continued for one hour at 65° C. and then at 75° C. for 5 hours. The mold was removed, and a white, opaque polymer tube with a porosity of 0.159 ml./ml. was obtained.

EXAMPLE X

In a monomer mixture containing 37.5 parts of chloroprene, 5.5 parts of styrene, and 57.0 parts of n-butyl methacrylate was dissolved 0.8 part of azobisisobutyronitrile, 0.2 part of di-t-butyl peroxide, and 7.0 parts of octylphenoxyethanol. To the organic mixture was added 47 parts of an aqueous solution containing 2% by weight of an octylphenoxypolyethoxyethanol containing 40 ethoxy groups under agitation and cooling. The resulting creamy mixture was then poured into a heavy-walled sheet mold which had been flushed with nitrogen and sealed in with essentially no vapor space. The mold was heated at 40° C. for 24 hours and then at 100° C. for 6 hours to effect post cure. The resulting polymer sheet was dried in vacuo at 65° C. to give a porous, flexible, off-white sheet.

EXAMPLE XI

A monomer solution was made up to consist of 45 parts methyl methacrylate, 15 parts of styrene, 0.4 part benzoyl peroxide and 1.2 parts octylphenoxyethanol. To the mixture was added under slight cooling and agitation 20 parts of an aqueous solution of 6.7% of an octylphenoxyethoxyethanol containing 69% ethoxy groups and 0.3% of sodium dodecylbenzenesulfonate. The resulting white, slightly viscous fluid was poured into a sealed mold and for 16 hours at 65° C. After this time, polymerization appeared complete, and the polymer slab was removed from the mold and dried for 6 hours at 75° C. The resulting material was white and friable, and could be readily ground to a powder of extremely fine particle size.

EXAMPLE XII

Into 30 parts of methyl methacrylate, which had been stripped of inhibitor, was dissolved 0.2 part of benzoyl peroxide and 0.8 part of an octylphenoxypolyethoxyethanol containing 2 ethoxy groups. To the monomer solution was then added an aqueous solution of 0.3% sodium lauryl sulfate and 6.4% of an octylphenoxypolyethoxyethanol containing 40 ethoxy groups. The mixture was agitated vigorously for about five minutes to produce a homogeneous white, viscous cream. The fluid was poured into a cylindrical mold which had previously been flushed with nitrogen, and the mold was capped. The mold was heated at 70° C. for five hours after which time polymerization appeared to be complete. The mold was then uncapped and heated at 65° C. for 16 hours to remove most of the water in the polymer. The polymer was removed from the mold and dried for 6 hours more at 70° C. to drive off residual moisture. The polymer rod so obtained was white, opaque and tough and had a density of 0.98 gm./ml.

I claim:

1. A process for the preparation of substantially solid, water-insoluble, cross-linked copolymers that are useful for conversion to ion exchange resins, which comprises polymerizing in bulk, with oxygen substantially excluded, a homogeneous mixture consisting of (1) a monovinyl aromatic hydrocarbon or mixtures thereof, (2) a polyvinyl aromatic hydrocarbon, said mono- and polyvinyl aromatic hydrocarbons being extended with (3) 5 to 70% water, the percentage being based on the weight of the total homogeneous mixture, (4) a polymerization initiator from the class consisting of peroxide and azo catalysts, water-soluble free radical initiators, and catalysts which activate ultraviolet light as a polymerization agent, and (5) a surfactant selected from the group consisting of (a) nonionic surfactants, (b) anionic surfactants, and (c) mixtures of a nonionic surfactant and an anionic surfactant, the nonionic surfactants being selected from the group consisting of octyl and nonyl-phenoxy (polyethoxyethanols) in which the ethoxy groups range from 0 to 69, and the anionic surfactants are selected from the group consisting of sodium lauryl sulfate and dodecylbenzene sodium sulfonate, the various reactants being mixed and agitated together until a substantially uniform, cream-like paste is produced.

2. A process as set forth in claim 1 in which the polymerization is effected at a temperature of from 20° to 150° C.

3. A process as set forth in claim 1 in which the polymerization is effected at a temperature of from 70° C. to 110° C.

4. A process as set forth in claim 1 in which there are used 100 to 0 parts of the monovinyl aromatic hydrocarbons to 0 to 100 parts of the polyvinyl aromatic hydrocarbons.

References Cited

UNITED STATES PATENTS

| 2,531,196 | 11/1950 | Brubaker et al. | 260—88.2 |
|---|---|---|---|
| 2,588,975 | 3/1952 | Fryling et al. | 260—88.2 |
| 3,022,253 | 1/1962 | McMaster | 260—2.1 |
| 3,186,975 | 1/1965 | Harris | 260—88.2 |
| 3,244,772 | 4/1966 | Von Bonin et al. | 260—88.2 |
| 3,255,127 | 6/1966 | Von Bonin et al. | 260—93.5 |
| 3,255,164 | 6/1966 | Visger et al. | 260—93.5 |

FOREIGN PATENTS

| 631,207 | 11/1951 | Canada. |
|---|---|---|
| 885,719 | 12/1961 | Great Britain. |
| 1,137,554 | 10/1962 | Germany. |

OTHER REFERENCES

Bovey et al.: Emulsion Polymerization, Interscience Publishers, New York (1955), QD 281 P6B6, pages 141–142.

Peper-Journal of Applied Chemistry, vol. 1, 1951, pp. 124–132.

WILLIAM H. SHORT, *Primary Examiner.*

H. D. ANDERSON, C. A. WENDEL,
*Assistant Examiners.*